Figure 1:
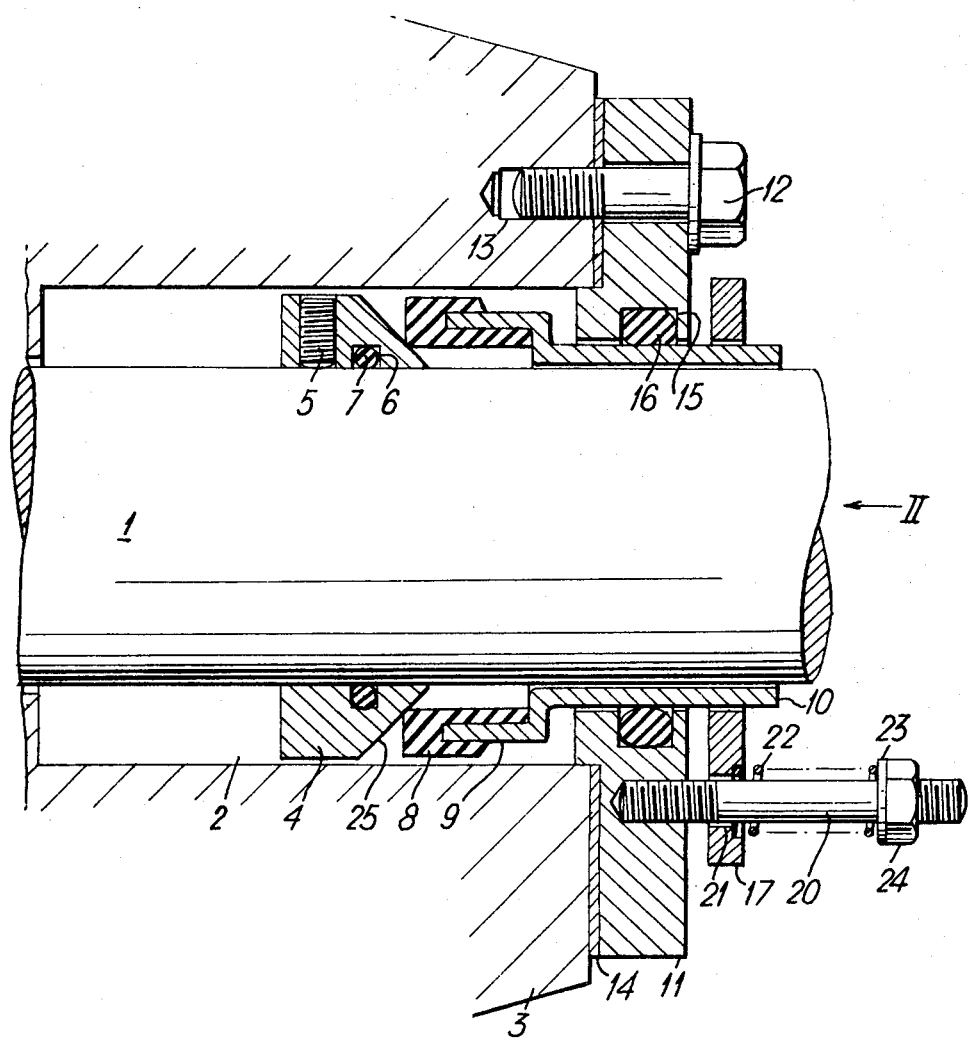

United States Patent [15] 3,705,728
Millar [45] Dec. 12, 1972

[54] ROTARY SHAFT SEALS
[72] Inventor: Thomas Ritchie Millar, Slough, England
[73] Assignee: Trist Mouldings & Seals Limited, Buckinghamshire, England
[22] Filed: Dec. 3, 1970
[21] Appl. No.: 94,694

[52] U.S. Cl. .................................................. 277/81
[51] Int. Cl. .............................................. F16j 15/34
[58] Field of Search.........277/81, 91, 40, 85, DIG. 6, 277/38–43

[56] References Cited

UNITED STATES PATENTS 2,555,932 6/1951 Reed ............................ 277/81
3,109,659 11/1963 Gits et al. ..................... 277/91

OTHER PUBLICATIONS

John Crane Mechanical Seals, Bulletin No. S– 204– 1, page 7, March 1953.

Primary Examiner—William F. O'Dea
Assistant Examiner—Robert I. Smith
Attorney—Holcombe, Wetherill & Brisebois

[57] ABSTRACT

A rotary shaft seal is of the kind which comprises two sealing rings, the first of which is mounted on and rotates with the shaft and the second of which is mounted on a non-rotatable sleeve. The sleeve surrounds the shaft within a tubular housing which has an open end and the sleeve is sealed to the housing in which it is axially slidable under spring pressure to press the second ring against the conical surface on the first ring to form a seal. The first sealing ring is mounted on the shaft within the housing, the second sealing ring is mounted on the inner end of the sleeve, the spring pressure urges the sleeve inwards into the housing to press the second ring against the conical surface on the first ring and the seal between the sleeve and the housing is at the open outer end of the housing, that is on the side of the second sealing ring remote from the first sealing ring.

3 Claims, 2 Drawing Figures

PATENTED DEC 12 1972  3,705,728

2 Sheets-Sheet 1

Inventor
T. R. MILLAR
By
Holcombe, Wetherill & Brisebois
Attorneys

Inventor
T. R. MILLAR
By
Holcombe, Wetherill + Brisebois
Attorneys

3,705,728

ROTARY SHAFT SEALS

This invention relates to rotary shaft seals of the kind which comprise two sealing rings, the first of which is mounted on and rotates with the shaft and the second of which is mounted on a non-rotatable sleeve. The sleeve surrounds the shaft within a tubular housing which has an open end and to which the sleeve is sealed. The sleeve is slidable within the housing under spring pressure to press the second ring against a conical surface on the first ring to form a seal.

In previous seals of this kind, the first sealing ring, which is mounted on the shaft, has been located outside the housing and the sleeve is sealed to the housing at its inner end and carries the second sealing ring at its outer end. The spring pressure acts to push the sleeve outwards in the housing to push the second sealing ring against the conical surface on the first ring.

This previous arrangement is somewhat cumbersome in that both the sealing rings and the part of the sleeve which carries the second sealing ring are located outside the housing and because both the sealing rings are outside the housing they are unprotected against accidental damage. Further, dirt may penetrate between the mating surfaces of the two sealing rings and this may give rise to rapid wear or damage to the surfaces giving rise to leakage.

According to this invention, in a seal of the kind described, the first sealing ring is mounted on the shaft within the housing, the second sealing ring is mounted on the inner end of the sleeve, the spring pressure urges the sleeve inwards into the housing to press the second ring against the conical surface of the first ring and the sleeve is sealed to the housing on the outside of the two sealing rings, that is nearer the open end of the housing than the two sealing rings.

The arrangement overcomes the shortcomings of the previous construction mentioned above in that the main part of the sleeve and both of the sealing rings are located within the housing so that the construction is compact and the mating surface of the two sealing rings are enclosed within the housing by the seal between the sleeve and the housing so that they are protected against the intrusion of dirt between them. Also, because both the rings are within the housing, a much greater surface area of these rings is exposed to the liquid which is sealed in, that is the liquid being pumped when the seal is fitted to a rotary pump, than when the rings are external. This greatly improves the dissipation of heat from the running surface of the rings which enables the seal to be used at higher speeds than were possible with the previous arrangement. Further, the construction of the sleeve and the attachment of the second sealing ring to the sleeve can be simplified so that the seal as a whole may be made more cheaply.

The outer, open end of the housing may be formed by an annular flange which is fixed to the remainder of the housing and in this case the flange is preferably provided with an internal peripheral groove holding an O-ring which is in contact with the outer periphery of the sleeve and forms the seal between the sleeve and the housing. The sleeve is preferably provided with a radially projecting flange outside the flange of the housing and in this case the spring pressure is provided by two or more springs which act at equi-angularly spaced points on the flange of the sleeve. The sleeve flange may be formed integrally with the remainder of the sleeve, but to facilitate assembly, it is preferably a loose flange and to enable the spring pressure to be transmitted from the flange to the sleeve, the flange has two or more equi-angularly spaced lugs projecting inwards from its inner periphery. These lugs engage in slots in the outer end of the sleeve and prevent the flange moving axially inwards relative to the sleeve and thus transfer the spring pressure from the flange to the sleeve itself. The lugs also prevent the sleeve from rotating under the torque transmitted to it through the sealing rings.

Figure 2:
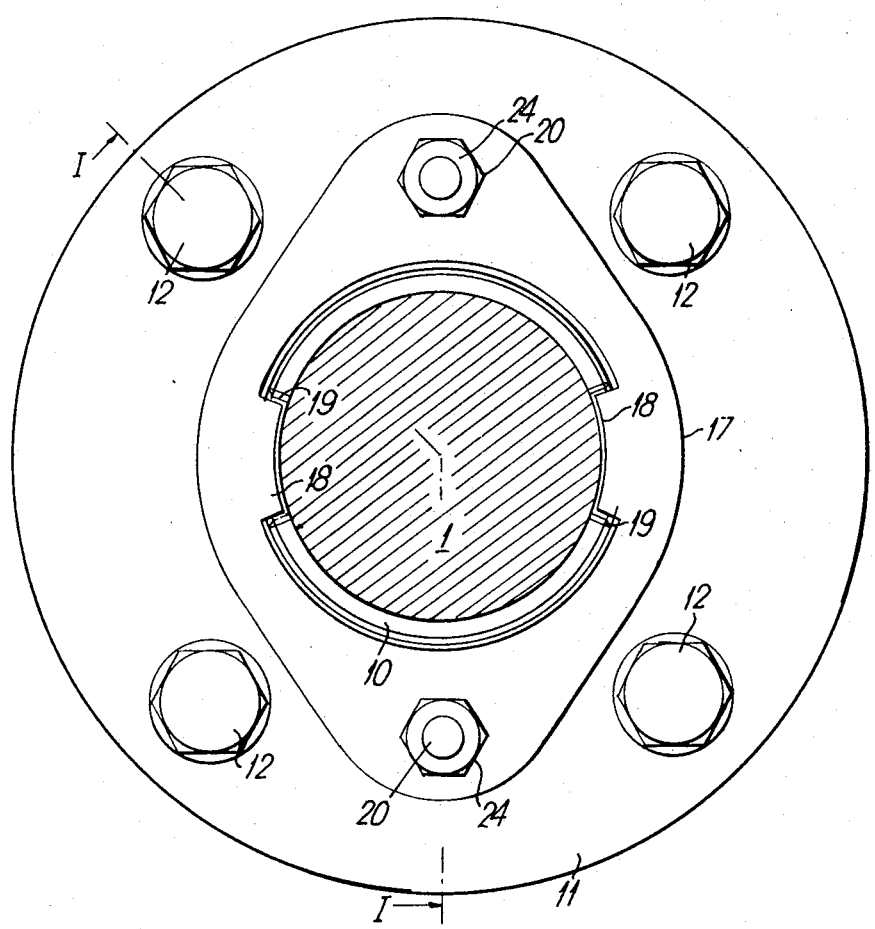

An example of a rotary shaft seal constructed in accordance with the invention is illustrated in the accompanying drawings in which:

FIG. 1 is a longitudinal section through the seal as seen in the direction of the arrows on the line I—I in FIG. 2; and, FIG. 2 is an end elevation of the seal as seen in the direction of the arrow II in FIG. 1.

A shaft 1, which may, for example, be part of a rotary pump, extends through a cylindrical chamber 2 within a housing 3. A first sealing ring 4, which in this example is made of metal, but may be made of ceramic material, closely surrounds the shaft 1 and is fixed in position on it by means of a grub screw 5. The ring 4 has an internal annular groove 6 holding a rubber O-ring 7 which forms a seal between the ring 4 and the surface of the shaft 1.

A second sealing ring 8, which in this example is made of rubber, but may alternatively be made of asbestos/resin, carbon or bronze material, is bonded or stuck by an adhesive on the inner end of an enlarged portion 9 of a sleeve 10 which surrounds the shaft 1 and extends into the housing 3.

The outer end of the housing 3 is formed by a flange 11 which is clamped to the main body of the housing 3 by set screws 12 screwed into tapped bores 13 in the housing. A gasket 14 is interposed between the flange 11 and the face of the housing 3 to form a liquid tight seal. The flange 11 has an internal annular groove 15 holding a rubber O-ring 16 which forms a seal between the outer periphery of the sleeve 10 and the flange 11 so that with the gasket 14 there is a seal between the housing 3 and the sleeve 10, but the sleeve 10 and with it the ring 8 which it carries, is able to move axially.

A loose flange 17 surrounds the outer end of the sleeve 10 outside the housing 3 and the flange 17 has two diametrically opposite inwardly projecting lugs 18 which engage in slots 19 formed in the end of the sleeve 10. These inter-engaging lugs and slots prevent the sleeve 10 from rotating relatively to the flange 17 and also transmit thrust which is applied in a direction towards the left as seen in FIG. 1 from the flange 17 to the sleeve 10 whence it is further transmitted to the ring 8.

Two studs 20 are screwed into tapped bores in the flange 11 and extend freely through holes 21 in the flange 17. Coiled compression springs 22 surround the studs 20 on the outside of the flange 17 and act between the flange 17 and washers 23 held in position by nuts 24 on the free ends of the studs 20. The springs 22, the compression of which can be adjusted by tightening or loosening the nuts 24 thus apply a pressure to the flange 17 and this pressure is transmitted to the ring 8 which is thus pressed against a frustoconical surface 25 on the ring 4 to form a seal between the two rings. Since the ring 4 is sealed to the shaft 1 and the ring 8 is indirectly sealed to the housing 3, there is therefore a rotary seal provided by relative rotation between the rings 4 and 8, between the shaft 1 and its surrounding housing.

In the example illustrated, the sealing ring 4 has a male frustoconical surface 25 which engages with the internal periphery of the ring 8. As an alternative to this, however, the ring 4 may be provided with a female frustoconical surface and in this case the ring 8 is made of smaller external diameter and its outer peripheral edge engages with the female frustoconical surface on the ring 4.

I claim:

1. In a rotary shaft seal of the kind including a shaft, a housing surrounding said shaft, a first sealing ring fixedly mounted on said shaft within said housing, a second sealing ring mounted on the inner end of said sleeve within said housing, means fixedly mounting said first sealing ring on said shaft for rotation therewith, a sleeve surrounding said shaft, means axially movably, but non-rotatably, mounting said sleeve in said housing, means fixedly mounting said second sealing ring on the end of said sleeve, means located on the side of said second sealing ring remote from said first sealing ring and forming a seal between said sleeve and said housing, and spring means biasing said sleeve axially inward into said housing to press said second ring against said first ring to form a seal therebetween, the improvement according to which the means forming a seal between said sleeve and housing comprises an annular flange extending around said shaft and said sleeve, means fixing said flange to said housing to form an open outer end thereof, means on said flange defining an internal peripheral groove, and an O-ring in said groove in contact with said sleeve.

2. A rotary shaft seal as claimed in claim 1, comprising a radially projecting flange outside said housing, a plurality of springs forming said spring means and acting on said flange at equi-angularly spaced points therearound and connecting means operatively connecting said flange to said sleeve, said connecting means including a plurality of lugs equi-angularly spaced around said flange and projecting inwards towards said shaft and means defining a plurality of slots in the outer end of said sleeve, said lugs engaging one in each of said slots to transmit pressure of said springs from said flange to said sleeve and to prevent said sleeve from rotating under torque transmitted to it from said first sealing ring through said second sealing ring as said shaft rotates.

3. A rotary shaft seal as claimed in claim 2, further comprising screw-threaded studs fixed to said housing, and nuts screwed onto said studs, said springs being coiled compression springs surrounding said studs and acting between said radially projecting flange and said nuts.

* * * * *